United States Patent
Pawlik et al.

(10) Patent No.: US 9,016,850 B1
(45) Date of Patent: Apr. 28, 2015

(54) PRINTING INFORMATION ON A SUBSTRATE

(71) Applicants: Thomas D. Pawlik, Rochester, NY (US); Douglas E. Bugner, Rochester, NY (US)

(72) Inventors: Thomas D. Pawlik, Rochester, NY (US); Douglas E. Bugner, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 14/097,333

(22) Filed: Dec. 5, 2013

(51) Int. Cl.
- *B41J 2/01* (2006.01)
- *B41J 3/407* (2006.01)
- *B41M 5/382* (2006.01)

(52) U.S. Cl.
CPC ..................................... *B41M 5/382* (2013.01)

(58) Field of Classification Search
CPC ........ B41J 11/002; B41J 11/0015; B41J 2/01; B41J 3/60; B41J 3/01; B41J 3/4078; B41M 7/0081; B41M 7/0072; B41M 5/5218; B41M 5/52; B41M 5/506; B41M 5/502; C09D 11/101; B42D 15/00; B42D 2033/20; B42D 2031/08; B42D 2031/22; B42D 2031/04; G02B 5/201; D06P 5/30; G06K 1/121; C04B 41/009; G02F 1/133516
See application file for complete search history.

(56) References Cited

U.S. PATENT DOCUMENTS

| | | |
|---|---|---|
| 3,747,120 A | 7/1973 | Stemme |
| 3,946,398 A | 3/1976 | Kyser et al. |
| 4,541,830 A | 9/1985 | Hotta et al. |
| 4,695,287 A | 9/1987 | Evans et al. |
| 4,698,651 A | 10/1987 | Moore et al. |
| 4,701,439 A | 10/1987 | Weaver et al. |
| 4,743,582 A | 5/1988 | Evans et al. |
| 4,753,922 A | 6/1988 | Byers et al. |
| 4,757,046 A | 7/1988 | Byers et al. |
| 4,769,360 A | 9/1988 | Evans et al. |
| 5,026,677 A | 6/1991 | Vanmaele |
| 5,101,035 A | 3/1992 | Bach et al. |
| 5,142,089 A | 8/1992 | Vanmaele |
| 5,804,531 A | 9/1998 | Evans et al. |
| 6,265,345 B1 | 7/2001 | Yoshida et al. |
| 6,517,197 B2 | 2/2003 | Hawkins et al. |
| 6,554,410 B2 | 4/2003 | Jeanmaire et al. |
| 6,575,566 B1 | 6/2003 | Jeanmaire et al. |
| 6,588,888 B2 | 7/2003 | Jeanmaire et al. |
| 6,682,182 B2 | 1/2004 | Jeanmaire et al. |
| 6,793,328 B2 | 9/2004 | Jeanmaire |
| 6,866,370 B2 | 3/2005 | Jeanmaire |
| 8,398,223 B2 | 3/2013 | Bugner et al. |
| 2002/0149658 A1 * | 10/2002 | Furukawa ..................... 347/101 |
| 2003/0181331 A1 | 9/2003 | Ieshige et al. |
| 2011/0111188 A1 * | 5/2011 | Xu et al. ........................ 428/203 |
| 2013/0237661 A1 | 9/2013 | Brust et al. |

FOREIGN PATENT DOCUMENTS

EP    0 835 292 B1    3/2002

* cited by examiner

*Primary Examiner* — Lisa M Solomon
(74) *Attorney, Agent, or Firm* — Nelson Adrian Blish

(57) ABSTRACT

A system for printing information on a substrate includes a printer for printing the information on a first surface of the substrate; and a heater for heating the substrate causing at least a portion of the printed information to migrate to a second surface of the substrate.

21 Claims, 13 Drawing Sheets

TEST OF SECURITY INK

0 1 2 3 4 5 6 7 8 9 0    0 1 2 3 4 5 6 7 8 9 0

0  1  2  3  4  5  6  7  8  9  0            120

TEST OF SECURITY INK

0 1 2 3 4 5 6 7 8 9 0    0 1 2 3 4 5 6 7 8 9 0

0  1  2  3  4  5  6  7  8  9  0

TEST OF SECURITY INK

0 1 2 3 4 5 6 7 8 9 0    0 1 2 3 4 5 6 7 8 9 0

0  1  2  3  4  5  6  7  8  9  0

⟶
DIRECTION OF MOVEMENT

TEST OF SECURITY INK 01234567890   01234567890

0  1  2  3  4  5  6  7  8  9  0

120

TEST OF SECURITY INK 01234567890   01234567890

0  1  2  3  4  5  6  7  8  9  0

TEST OF SECURITY INK 01234567890   01234567890

0  1  2  3  4  5  6  7  8  9  0

0123456789
AUTHENTIC
CODE: ABCDE

0123456789
AUTHENTIC
CODE: ABCDE

0123456789
AUTHENTIC
CODE: ABCDE

*FIG. 10*

PRINTING INFORMATION ON A SUBSTRATE

CROSS REFERENCE TO RELATED APPLICATIONS

Reference is made to commonly-assigned copending U.S. patent application Ser. No. 14/097,324 filed Dec. 5, 2013, entitled METHOD OF PRINTING INFORMATION ON A SUBSTRATE, by Pawlik et al., the disclosure of which is incorporated herein.

FIELD OF THE INVENTION

The invention relates in general to printing information on a substrate and in particular to migration of a portion of the printed information to a second surface of the substrate.

BACKGROUND OF THE INVENTION

Information printed with bleed through or penetrating ink is a document security feature that is common in checks and other monetary instruments. The bleed through effect makes alteration of the document much more difficult. Verification of the security feature is possible without additional tools.

Most commonly, bleed through inks consist of a black colorant that stays on the print side of the media and a magenta colorant that penetrates the media and creates a visible stain on the non-print side of the media. For printing of fixed data, inks can be printed specifically by dry or wet offset by screen-, flexo- and gravure-printing or by letterpress.

For variable data such as check numbers, this security feature is most commonly applied via impact printing. The inks used in impact printing are often oil based so that the drying time is extended, thus allowing the dye to penetrate as shown in European Patent No. 0 835 292 B1. Characters or linear barcodes are imprinted using coding wheels such as the impact numbering machines offered by the company Atlantic Zeiser.

A disadvantage of the impact printing approach is that there is limited flexibility to design the printed information. It is limited to a fixed number of digits of numbers and some one-dimensional barcodes of fixed length. Two-dimensional barcodes and graphics cannot be printed in this manner. Therefore, it is desirable to have a digital, non-impact way of delivering this security feature such as continuous inkjet printing. It can be difficult, however, to formulate a continuous inkjet ink that has the necessary penetrating and drying properties while maintaining good drop generation and recirculation properties and image quality. It is particularly difficult to generate a two component ink wherein one colorant stays on the print side of the media while the other penetrates to the non-print side.

An inkjet printing ink that does not need to have unusual penetrating properties, but that still forms an image on the non-print side of the media would therefore be desirable.

SUMMARY OF THE INVENTION

Briefly, according to one aspect of the present invention a system for printing information on a substrate includes a printer for printing the information on a first surface of the substrate; and a heater for heating the substrate causing at least a portion of the printed information to migrate to a second surface of the substrate.

The present invention is an integral printing ink that contains a black colorant and a magenta colorant. The black colorant may be, for example, carbon black and the magenta colorant is a sublimable pigment or dye. The document is printed with this combination. Subsequently, the printed document is exposed to a temperature above the sublimation temperature of the magenta colorant. In the gaseous state the magenta colorant will penetrate the porous substrate and after sufficient heating a mirror image of the printed information will be visible on the non-print side. Preferably, heating of the document will be performed using infrared dryers, such as manufactured by Adphos Innovative Technology GmbH and implemented on Prosper presses such as manufactured by Eastman Kodak Company.

The magenta and black components of the ink can also be printed in registration in separate passes. On some substrates the inks will form a mixed phase rather than a layered structure and the two pass printing will create the same result as one pass printing with a single ink that integrates both colorants. With a two pass approach, however, one has the opportunity to print different information with the two colorants. For example, one can print a text or number and then overprint this text with a solid area of black ink. The text or number will be invisible. After heating of the print media, the magenta ink component will become volatile and migrate such that the hidden information will become visible. This could serve as a security and authentication feature. Experiments with two pass printing have also shown that, in the absence of the black colorant, the magenta dye will not reach sublimation temperature in the IR dryer. Therefore this security ink relies on the two-step process of black colorant as IR absorber and heat generator and the magenta dye as the heat activated mobile component.

The invention and its objects and advantages will become more apparent in the detailed description of the preferred embodiment presented below.

BRIEF DESCRIPTION OF THE DRAWINGS

FIG. 10 is the halftone image of the print side of a printed sheet of paper wherein magenta text and numbers were printed in a first pass.

DETAILED DESCRIPTION OF THE INVENTION

Figure 1:
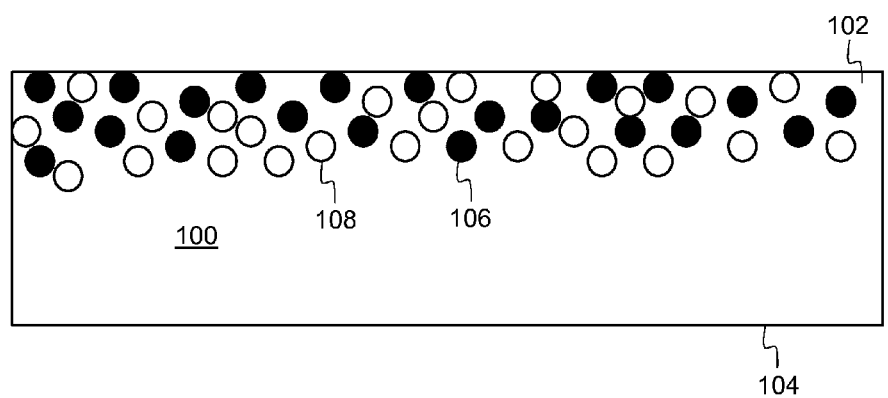
FIG. 1 is a schematic representation of a printed substrate.

The present invention will be directed in particular to elements forming part of, or in cooperation more directly with the apparatus in accordance with the present invention. It is to be understood that elements not specifically shown or described may take various forms well known to those skilled in the art.

The present invention is a method of printing information on a first surface of a substrate using two ink components wherein the first ink component absorbs electromagnetic radiation converting it to heat and the second ink component is able to migrate to a second surface of the substrate. In preferred embodiments, the black colorant is carbon black and the magenta colorant is a sublimable pigment or dye although other colors and materials may be suitable. The document is printed with this combination either using the mixture of the two ink components in an integral printing ink, or applying the inks separately in a two pass printing step. Subsequently the printed document is exposed to a temperature above the sublimation temperature of the magenta colorant. In the gaseous state the magenta colorant will penetrate the porous substrate and after sufficient heating a mirror image of the printed information will be visible on the non-print side.

The printing ink can be delivered by conventional contact printing methods such as offset, gravure, flexography, letterpress. Preferably, a digital printing method like electrophotography or inkjet printing can be used because it allows for the printing of variable content. Drop-on-demand (DOD) liquid emission devices have been known as ink printing devices in ink jet printing systems for many years. Early devices were based on piezoelectric actuators such as are disclosed in U.S. Pat. Nos. 3,946,398 and 3,747,120. A currently popular form of ink jet printing, thermal ink jet (or "thermal bubble jet"), uses electrically resistive heaters to generate vapor bubbles which cause drop emission, as is discussed in U.S. Pat. No. 4,296,421. In another process, known as continuous inkjet (CIJ), a continuous stream of droplets is generated, a portion of which are deflected in an image-wise manner onto the surface of the image-recording element, while un-imaged droplets are caught and returned to an ink sump. Continuous inkjet printers are disclosed in U.S. Pat. Nos. 6,588,888; 6,554,410; 6,682,182, 6,793,328, 6,866, 370, 6,575,566, and 6,517,197.

The inks used for inkjet printing are typically water-based and formulated to comprise a selection of water, dispersed pigment particles, dyes, humectants, dispersants, surfactants, biocides, polymers and organic solvents. Formulations for drop-on-demand (DOD) printing inks are disclosed in U.S. Patent Application No. 2013/0237661 which is incorporated herein in its entirety by reference. Likewise, formulations for CIJ inks are disclosed in U.S. Pat. No. 8,398,223 which is incorporated herein in its entirety by reference.

Examples of suitable sublimable dyes, including magenta, yellow, and cyan dyes, can include, but are not limited to, diarylmethane dyes; triarylmethane dyes; thiazole dyes, such as 5-arylisothiazole azo dyes; methine dyes such as merocyanine dyes, for example, aminopyrazolone merocyanine dyes; azomethine dyes such as indoaniline, acetophenoneazomethine, pyrazoloazomethine, imidazoleazomethine, imidazoazomethine, pyridoneazomethine, and tricyanopropene azomethine dyes; xanthene dyes; oxazine dyes; cyanomethylene dyes such as dicyanostyrene and tricyanostyrene dyes; thiazine dyes; azine dyes; acridine dyes; azo dyes such as benzeneazo, pyridoneazo, thiopheneazo, isothiazoleazo, pyrroleazo, pyrraleazo, imidazoleazo, thiadiazoleazo, triazoleazo, and disazo dyes; arylidene dyes such as alpha-cyano arylidene pyrazolone and aminopyrazolone arylidene dyes; spiropyran dyes; indolinospiropyran dyes; fluoran dyes; rhodaminelactam dyes; naphthoquinone dyes, such as 2-carbamoyl-4-[N-(p-substituted aminoaryl)imino]-1,4-naphthaquinone; anthraquinone dyes; and quinophthalone dyes. Specific examples of dyes usable herein can include:

C.I. (color index) Disperse Yellow 51, 3, 54, 79, 60, 23, 7, and 141;

C.I. Disperse Blue 24, 56, 14, 301, 334, 165, 19, 72, 87, 287, 154, 26, and 354;

C.I. Disperse Red 135, 146, 59, 1, 73, 60, and 167;

C.I. Disperse Orange 149;

C.I. Disperse Violet 4, 13, 26, 36, 56, and 31;

C.I. Disperse Yellow 56, 14, 16, 29, 201 and 231;

C.I. Solvent Blue 70, 35, 63, 36, 50, 49, 111, 105, 97, and 11;

C.I. Solvent Red 135, 81, 18, 25, 19, 23, 24, 143, 146, and 182;

C.I. Solvent Violet 13;

C.I. Solvent Black 3;

C.I. Solvent Yellow 93; and

C.I. Solvent Green 3.

Further examples of sublimable or diffusible dyes that can be used include anthraquinone dyes, such as Sumikalon Violet RS® (product of Sumitomo Chemical Co., Ltd.), Dianix Fast Violet 3R-FS® (product of Mitsubishi Chemical Corporation.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumickaron Diazo Black 5G® (product of Sumitomo Chemical Co., Ltd.), and Miktazol Black 5 GH® (product of Mitsui Toatsu Chemicals, Inc.); direct dyes such as Direct Dark Green B® (product of Mitsubishi Chemical Corporation) and Direct Brown M® and Direct Fast Black D® (products of Nippon Kayaku Co. Ltd.); acid dyes such as Kayanol Milling Cyanine 5R® (product of Nippon Kayaku Co. Ltd.); and basic dyes such as Sumicacryl Blue 6G® (product of Sumitomo Chemical Co., Ltd.), and Aizen Malachite Green® (product of Hodogaya Chemical Co., Ltd.).

Other suitable cyan dyes can include Kayaset Blue 714 (Solvent Blue 63, manufactured by Nippon Kayaku Co., Ltd.), Phorone Brilliant Blue S-R (Disperse Blue 354, manufactured by Sandoz K. K.), Waxoline AP-FW (Solvent Blue 36, manufactured by ICI), and cyan dyes of the structures

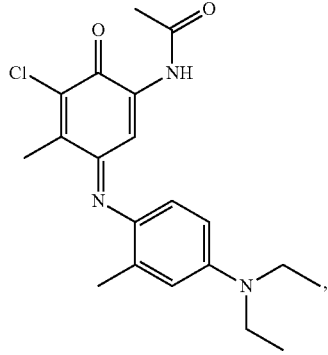

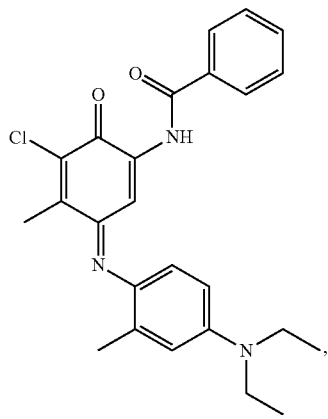

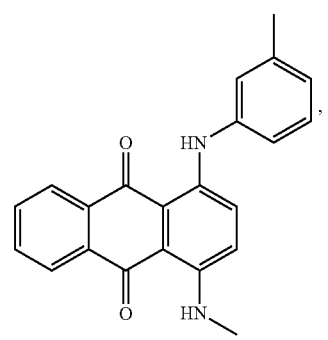

lp;2p

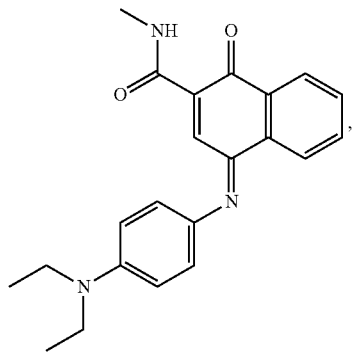

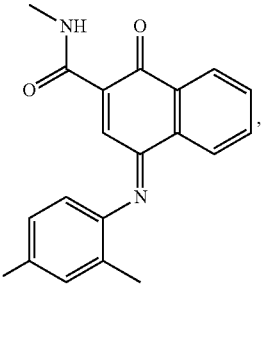

where R1 and R2 each independently represents an alkyl group, a cycloalkyl group, an aryl group, a heterocyclic group, or R1 and R2 together represent the necessary atoms to close a heterocyclic ring, or R1 and/or R2 together with R6 and/or R7 represent the necessary atoms to close a heterocyclic ring fused on the benzene ring; R3 and R4 each independently represents an alkyl group, or an alkoxy group; R5, R6, R7 and R8 each independently represents hydrogen, an alkyl group, a cycloalkyl group, an aryl group, an alkoxy group, an aryloxy group, a carbonamido group, a sulfamido group, hydroxy, halogen, NHSO2R9, NHCOR9, OSO2R9, or OCOR9, or R5 and R6 together and/or R7 and R8 together represent the necessary atoms to close one or more heterocyclic ring fused on the benzene ring, or R6 and/or R7 together with R1 and/or R2 represent the necessary atoms to close a heterocyclic ring fused on the benzene ring; and R9 represents an alkyl group, a cycloalkyl group, an aryl group and a heterocyclic group.

Other suitable yellow dyes can include Phorone Brilliant Yellow S-6 GL (Disperse Yellow 231, manufactured by Sandoz K. K.) and Macrolex Yellow 6G (Disperse Yellow 201, manufactured by Bayer), and yellow dyes of the structures

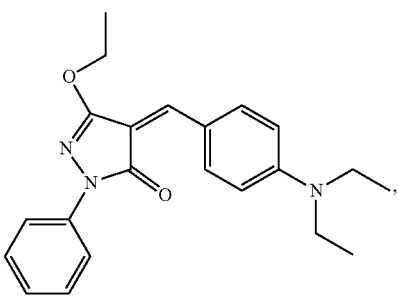

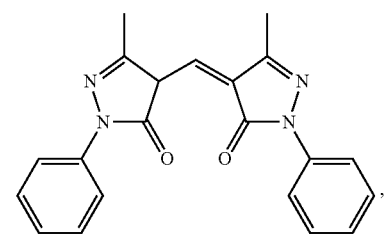

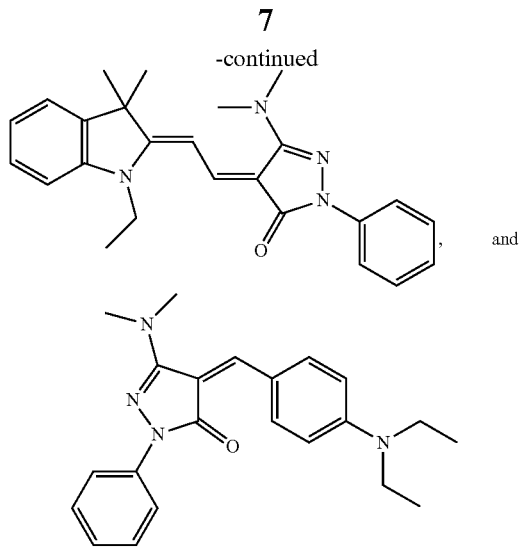

and

Further examples of useful dyes can be found in U.S. Pat. Nos. 4,541,830; 4,698,651; 4,695,287; 4,701,439; 4,757,046; 4,743,582; 4,769,360; 4,753,922; 5,026,677; 5,101,035; 5,142,089; 5,804,531; and 6,265,345; and U.S. Publication No. 2003/0181331. If the dyes are insoluble in the ink, they can be milled into pigments of a suitable size distribution and incorporated into the ink as a dispersion.

In order to show the effect of colorant bleed through in a black and white figure, the following image transformation was used for most figures depicting the backside of printed and treated samples. The surface of the printed media was scanned using the scanning function of a Kodak ESP 5200 All In One printer. Scanning was performed in color at 300 dpi. The images were saved as jpeg files. Subsequently, the image files were loaded into Corel Photo Paint 10 (Corel Corporation, 2000) and the following image transformations were executed: The color image was split into the Cyan, Magenta, Yellow and Black components. The Magenta component, represented by a 8-bit grayscale image, was then converted into a binary (black/white) image using a threshold of 225 within the allowed range of 0-255. Images processed this way will be referred to as "magenta extraction images." Images from the front side of media and the image shown in FIG. 4 were similarly scanned and were converted from the red, green, blue (RGB) color representation to binary images using Corel Photo Paint 10 by applying the standard halftone conversion (45 degree angle, 150 lines per inch). These images will be referred to as "halftone images."

Referring now to FIG. 1 which shows a schematic representation of a printed substrate 100. The ink applied to the print side of the substrate 102 consists of a first component 106 that is non-migrating under the influence of heat and a second component 108 that migrates under the influence of heat. The substrate is a porous medium such as paper. Therefore, the ink partially soaks into the substrate.

Figure 2:
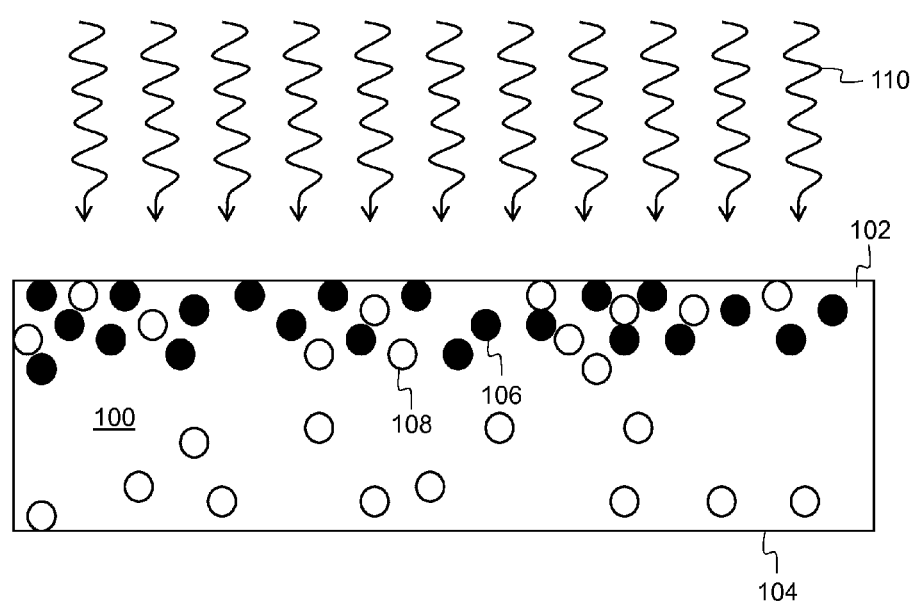
FIG. 2 is a schematic representation of a printed substrate under the influence of electromagnetic radiation.

FIG. 2 shows the printed substrate 100 under the influence of electromagnetic radiation containing infrared radiation 110. In this example, the first component of the ink 106 is able to absorb the electromagnetic radiation and convert it to heat. This leads to a local increase in temperature. The temperature increase is large enough such that the second component of the ink 108 is able to migrate through the porous structure of the substrate, and a fraction of the second component of the ink 108 appears on the non-print side of the substrate 104 creating a visible effect. If the electromagnetic radiation 110 is switched off and the temperature of the substrate returns to its ambient value, the second component of the ink 108 will no longer migrate and will be locked into position thus making the effect permanent unless the substrate is heated again.

Although paper was used as an example, this process can be used with other types of substrates, for example plastics, as long as the second component of the ink is chosen such that it has the ability to migrate through the substrate under the influence of heat.

Figure 3:
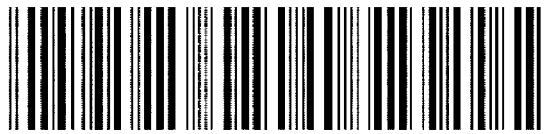
FIG. 3 is the halftone image of the print side of a printed sheet of paper using black ink.
Figure 3:
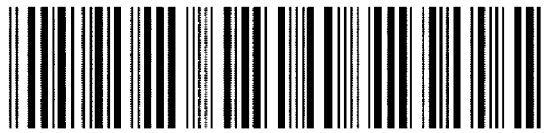
Figure 3:
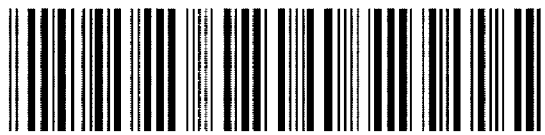

Referring now to FIG. 3 which shows a halftone image of the print side of a letter size sheet of Glatfelter multi-purpose office paper, Material No. 22761, that was printed using a DOD inkjet printer with an ink that contained carbon back as a black colorant. This printed sheet was subjected to a radiative heating procedure by moving it on a conveyor beneath a stationary Adphos NIR40 infrared dryer (adphos Innovative Technologies GmbH). The direction of movement is indicated by the arrow. A 1.3 speed setting was used for the conveyor which represents a speed of 18.9 feet/minute. The infrared dryer only heats part of the sheet in an area that is indicated by the dashed box 120.

Figure 4:
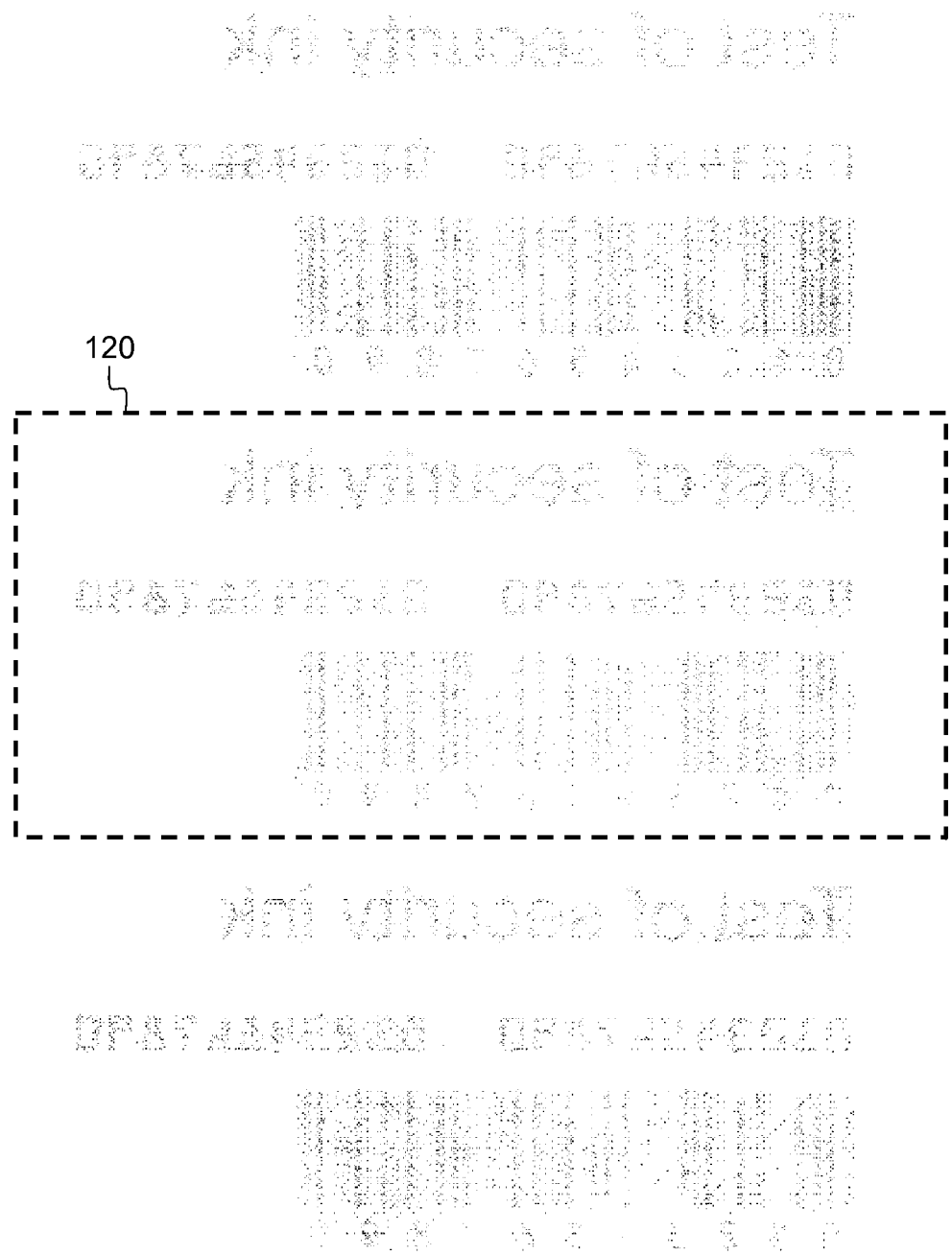
FIG. 4 is the halftone image of the non-print side of a printed sheet of paper using black ink.

FIG. 4 shows a halftone image of the non-print side of the paper in FIG. 3. It is evident that none of the image content from the print side of the paper appears on the non-print side. In particular there is not any more print density in the inside the heated area 120 compared to outside the heated area. This shows that the infrared heating procedure does not lead to migration of the carbon black component of the ink.

Figure 5:
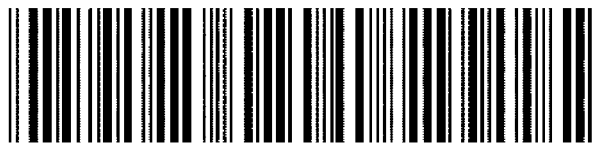
FIG. 5 is the halftone image of the print side of a printed sheet of paper using black and magenta ink according to the invention.
Figure 5:
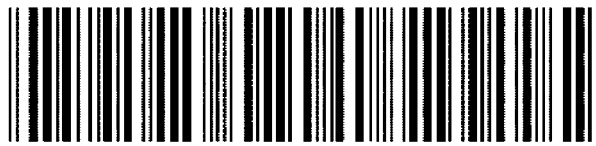
Figure 5:
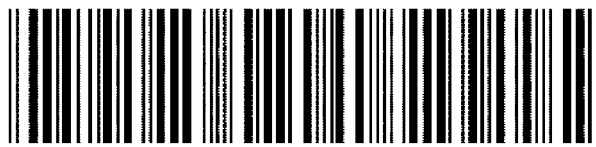

FIG. 5 shows a halftone image of the print side of a letter size sheet of Glatfelter multi-purpose office paper, Material No. 22761, that was printed using a DOD inkjet printer with an ink that contained both a black and magenta colorant. The black colorant was carbon black, the magenta colorant was Disperse Red #60 which is a colorant that is able to migrate under the influence of heat. This printed sheet was subjected to a radiative heating procedure by moving it on a conveyor beneath the stationary Adphos NIR40 infrared dryer. A 1.3 speed setting was used for the conveyor which represents a speed of 18.9 feet/minute. The infrared dryer only heats part of the sheet in an area that is indicated by the dashed box 120.

Figure 6:
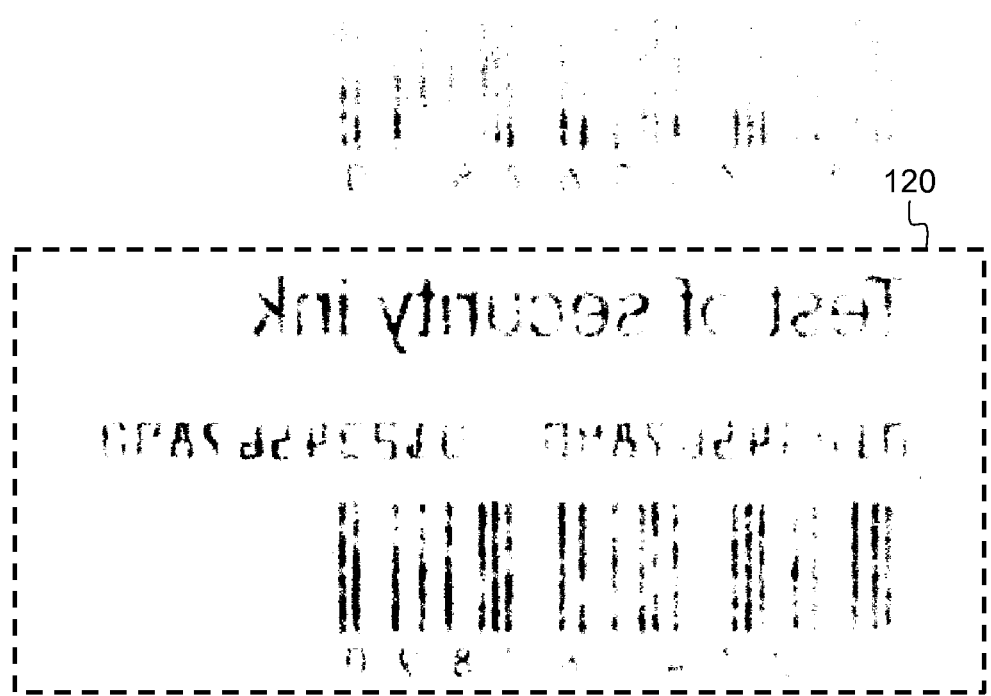
FIG. 6 is the magenta extraction image of the non-print side of a printed sheet of paper using black and magenta ink according to the invention.

FIG. 6 shows the magenta extraction image of the non-print side of the paper in FIG. 5. It is evident that a significant fraction of the image content from the print side of the paper appears in mirror image on the non-print side in the area 120 that is subject to the infrared heating process whereas outside of this area, no image appears. This shows that the infrared heating leads to migration of the magenta component of the ink.

Figure 7:
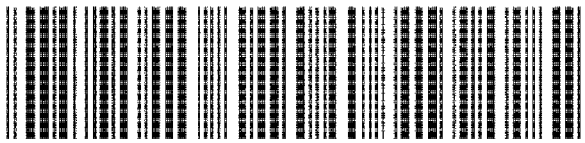
FIG. 7 is the halftone image of the print side of a printed sheet of paper using black and magenta ink in a two pass printing process according to the invention.
Figure 7:
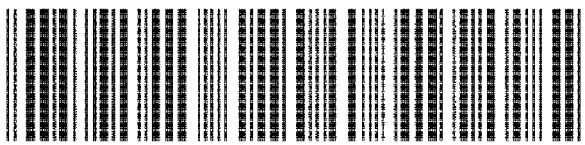
Figure 7:
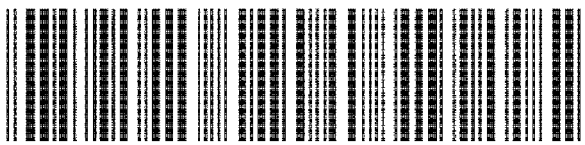

FIG. 7 shows a halftone image of the print side of a letter size sheet of Glatfelter multi-purpose office paper, Material No. 22761, that was printed in registration in two passes using a DOD inkjet printer. The first pass was printed with an ink that contained and magenta colorant. The magenta colorant was Disperse Red #60 which is a colorant that is able to migrate under the influence of heat. In the second pass in ink that contained only carbon black as a colorant was used for printing. This printed sheet was subjected to a radiative heating procedure by moving it on a conveyor beneath the stationary Adphos NIR40 infrared dryer. A 1.3 speed setting was used for the conveyor which represents a speed of 18.9 feet/minute. The infrared dryer only heats part of the sheet in an area that is indicated by the dashed box 120.

Figure 8:
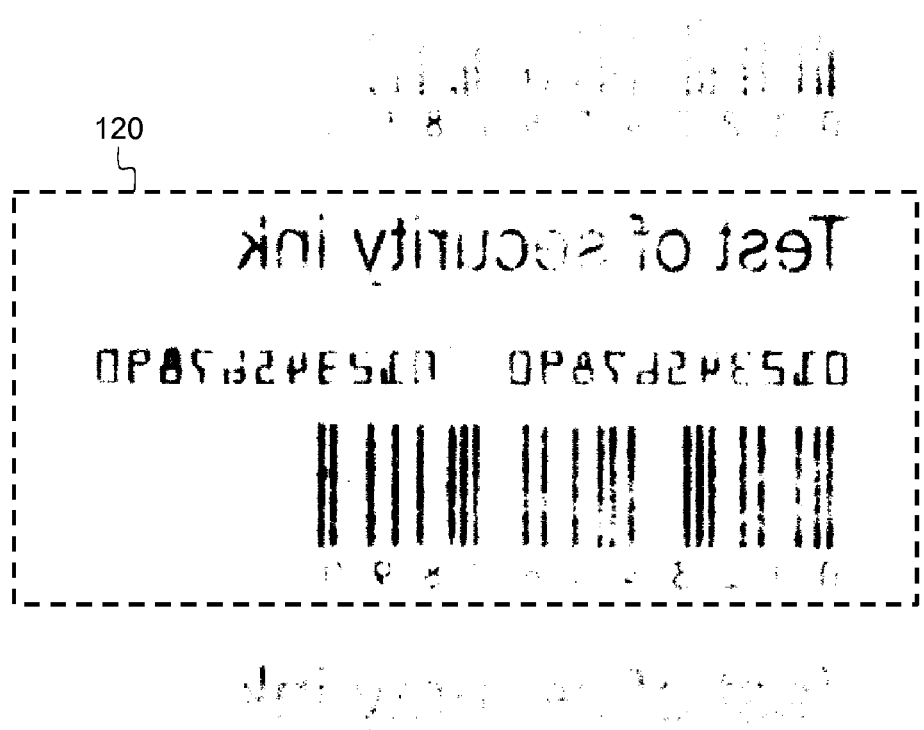
FIG. 8 is the magenta extraction image of the non-print side of a printed sheet of paper using black and magenta ink in a two pass printing process according to the invention.

FIG. 8 shows the magenta extraction image of the non-print side of the paper in FIG. 7. It is evident that the image content from the print side of the paper appears in mirror image on the non-print side in the area 120 that is subject to the infrared heating process whereas outside of this area, no image appears. This shows that the infrared heating leads to migration of the magenta component of the ink. The result of this two pass printing process is therefore similar to the case shown in FIG. 6 wherein a one pass printing process of a combined black and magenta ink was used. Printing a porous substrate such as the office paper in this example with two different inks will likely lead to a mixture of the two colorants on the printed substrate. In fact, reversing the order of printing had no effect on the non-print side image after the heating step. However, for other inks and substrates it may be conceivable that the sequence of printing could lead to different efficacy of migration, in particular if a multilayer structure is created on the print side of the substrate consisting of the individual inks One can then chose the sequence of printing that creates the optimal effect upon heat treatment.

Figure 9A:
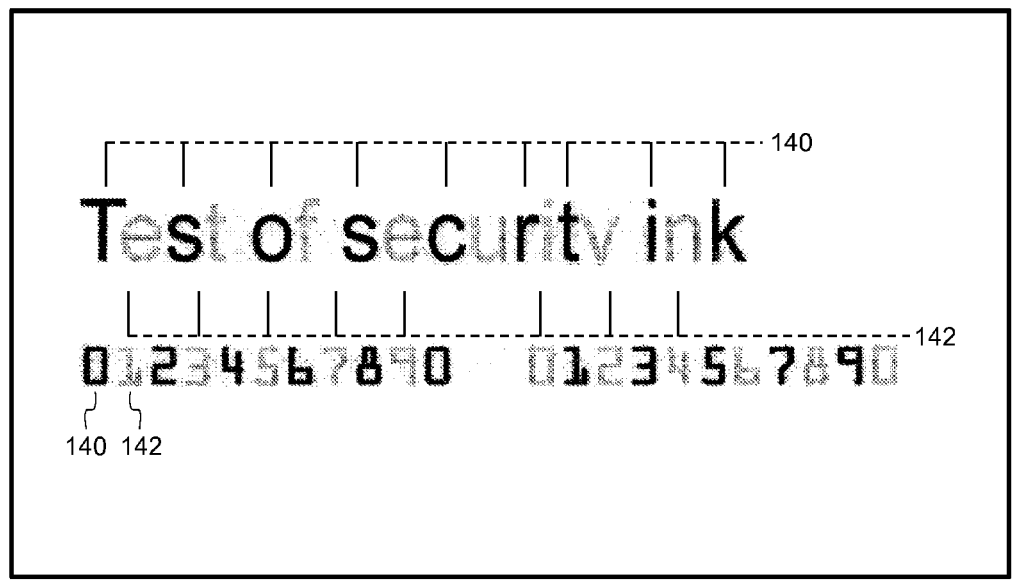
FIGS. 9a and 9b are the magenta extraction image of the non-print side of a printed sheet of paper using alternating characters printed with black and magenta ink or magenta ink only, respectively.

FIG. 9a shows a halftone image of the print side of a sheet of Glatfelter multi-purpose office paper, Material No. 22761 that was printed with a DOD inkjet printer in alternating fashion using two different inks. The first ink contained both black and magenta colorant according to the invention. Symbols printed with this ink are indicated by the reference number 140 and appear darker in the halftone image. The other symbols were printed with an ink that contained the magenta colorant only. These symbols, which appear lighter in the halftone image, are indicated by the reference number 142. Two strings of numbers were printed in similar fashion. Since the assignment to the two inks is evident from the darkness of the characters in FIG. 9a, only the first two numbers are explicitly assigned to 140 and 142.

Figure 9B:
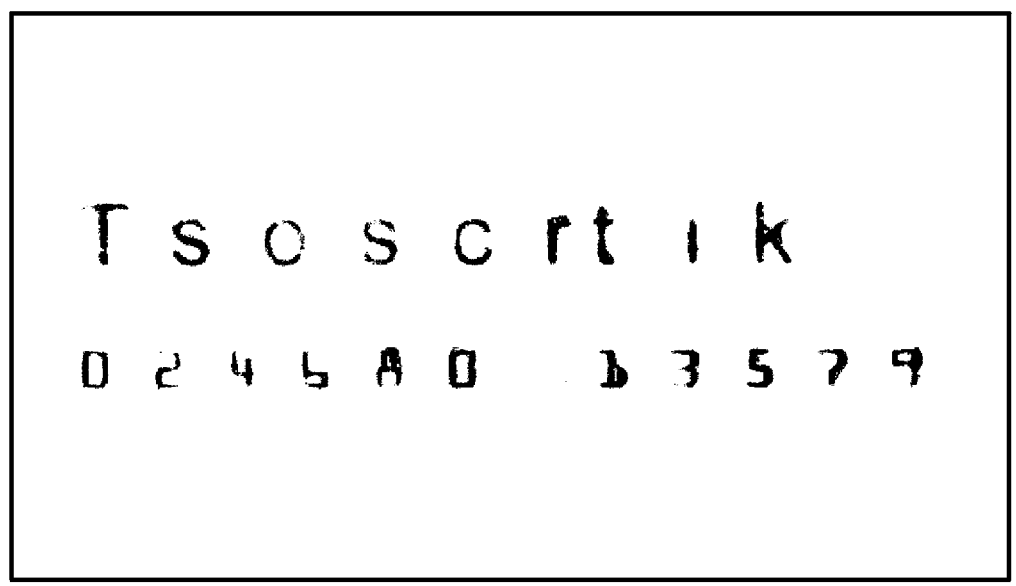

FIG. 9b shows the magenta extraction image of the non-print side of the printed sheet of FIG. 9a after heat treatment with the IR drying equipment at a nominal speed setting of 1.3. For better comparison of front side and back side images, FIG. 9b was also flipped horizontally thus reversing the effect of the mirror image. It is evident from FIG. 9b that only the characters that were printed with the combination of black and magenta colorant show on the back side of the paper after the heating process. This underscores that the black component of the ink is necessary to generate enough heat through absorption of the IR radiation to make the magenta colorant migrate through the paper.

FIG. 10 shows a halftone image of the print side of a sheet of Glatfelter multi-purpose office paper, Material No. 22761 that was printed with a DOD inkjet printer using magenta ink. Text and numbers were printed as a mirror image using ink with the magenta colorant Disperse Red #60 which is a colorant that is able to migrate under the influence of heat.

Figure 11:
FIG. 11 is the halftone image of the print side of a printed sheet of paper wherein magenta text and numbers and black overlapping rectangles were printed in two sequentially passes.
Figure 11:
Figure 11:
Figure 11:
Figure 11:
Figure 11:
Figure 11:
Figure 11:
Figure 11:

FIG. 11 shows a halftone image of the printed sheet of FIG. 10 that was overprinted in registration using a DOD inkjet printer with ink containing carbon black as a black colorant. Black rectangles were printed such that they completely overlap the text and numbers that were printed previously using magenta ink (compare FIG. 10). In the resulting halftone image, the printed text and numbers are obscured by the black rectangles, and therefore text and numbers are illegible.

Figure 12:
FIG. 12 is the magenta extraction image of the non-print side of a printed sheet of paper using where magenta text and numbers and black overlapping rectangles were printed sequentially in two passes.

FIG. 12 shows the magenta extraction image of the non-print side of the printed sheet of FIG. 11 after heat treatment with the IR drying equipment at a nominal speed setting of 1.5 corresponding to a conveyor speed of 22.8 feet/minute. It is evident in the figure that text and numbers that were printed using the magenta ink are now visible on the back side of the paper, but only inside the area 120 that experienced the heat from the IR dryer. This effect would be useful as a way of embedding hidden information in documents. The document containing the hidden information is issued subsequent to the printing step. At a later time and possibly in a different location, the document is subjected to heat either in a non-contact fashion as described in the prior examples, or through a contact heating process. After the application of heat, the document is inspected visually or via the use of electronic imaging equipment. The appearance of the hidden information pursuant to the heat treatment can be viewed as a proof of authenticity and the code that is revealed can be used as a key for other transactions such as a password or lottery number or can be checked against a second code printed in a different location. For authentication purposes, the mere effect that a bleed through feature appears after heat treatment can be viewed as a sign of authenticity.

Although carbon black was used in these examples as an efficient absorber for electromagnetic radiation in the infrared and visible spectrum, other compounds such as infrared radiation absorbing organic dyes or pigments, or inorganic infrared radiation absorbing materials can be used.

Typically, electromagnetic radiation for near-IR drying systems reaches maximum power at a wavelength (lambda max) of approximately 810 nm and the absorption spectrum of the absorbing material should overlap the spectrum of the electromagnetic radiation.

Figure 13:
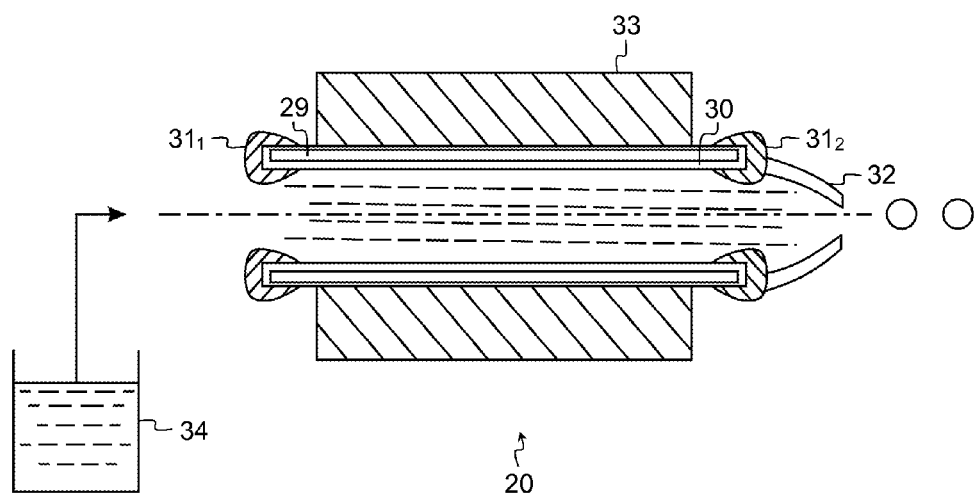
FIG. 13 is a cross-sectional view of an embodiment of an inkjet printer as used in the present invention.

In one embodiment of the invention ink may be delivered by an inkjet printer. FIG. 13 illustrates schematically an exemplary inkjet printer 20 with a thin film of resistor 30 as the heat generating member of the inside surface of a pipe 29. Electrodes $31_1$ and $31_2$ are formed on both ends of the pipe, and an orifice 32 is then mounted to one of the ends of the pipe, the fiber pipe is embedded in a heat sink 33. Ink is supplied from an ink supplying means 34, and square pulse of 5μ, sec. is applied to the heat generating member.

The invention has been described in detail with particular reference to certain preferred embodiments thereof, but it will be understood that variations and modifications can be effected within the scope of the invention.

PARTS LIST 20 inkjet printer
29 pipe
30 resistor
$31_1$ electrode
$31_2$ electrode
32 orifice
33 heat sink
34 ink supplying means
100 printed substrate
102 print side of substrate
104 non-print side of substrate
106 first component of the ink (non migrating)
108 second component of the ink (migrating)
110 electromagnetic radiation including infrared radiation
120 area in the printed sheets that is subject to heating from the infrared dryer
140 symbols (letters and numbers) printed with an ink containing black and magenta colorant
142 symbols (letters and numbers) printed with an ink containing magenta colorant only

The invention claimed is:

1. A system for printing information on a substrate comprising:
   a printer for printing the information on a first surface of the substrate; and
   a heater for heating the substrate causing at least a portion of the printed information to migrate to a second surface of the substrate, wherein an ink used for printing is a two component ink wherein a portion of a first ink component migrates under the influence heat of ink and a second ink component does not migrate under the influence of heat.

2. The system of claim 1 wherein heating occurs during the printing process.

3. The system of claim 1 wherein heating occurs at a remote location.

4. The system of claim 3 wherein printed information on the second surface is authenticated after heating.

5. The system of claim 1 wherein a portion of the first ink component migrates by a sublimation process.

6. The system of claim 1 wherein a portion of the first ink component migrates by a thermal diffusion process.

7. The system of claim 1 wherein the second ink component is a black colorant.

8. The system of claim 1 wherein the second ink component is a black pigment.

9. The system of claim 8 wherein the black pigment absorbs heat.

10. The system of claim 1 wherein the heater is an electromagnetic radiation source.

11. The system of claim 10 wherein the electromagnetic radiation provides infrared radiation.

12. The system of claim 1 wherein the heater is in direct contact with the first surface of the substrate.

13. A system for printing information on a substrate comprising:
 a printer for printing first information on a first surface of the substrate with a first colorant and second information on the first surface of the substrate with a second colorant; and
 a heater for heating the substrate causing at least a portion of the first or second printed information to migrate to a second surface of the substrate.

14. The system of claim 13 wherein the second information is printed in registration with the first information.

15. The system of claim 13 wherein the second information at least partially overlaps the first information.

16. The system of claim 13 wherein the second colorant is a black colorant.

17. The system of claim 13 wherein the second colorant is a black pigment.

18. The system of claim 17 wherein the black pigment absorbs heat.

19. The system of claim 13 wherein the heater is an electromagnetic radiation source.

20. The system of claim 19 wherein the heater provides infrared radiation.

21. The system of claim 13 wherein the heater is in direct contact with the first and second surface of the substrate.

* * * * *